Nov. 1, 1966  D. R. MITCHELL  3,282,112
PRESSURE GAGE
Filed March 12, 1965
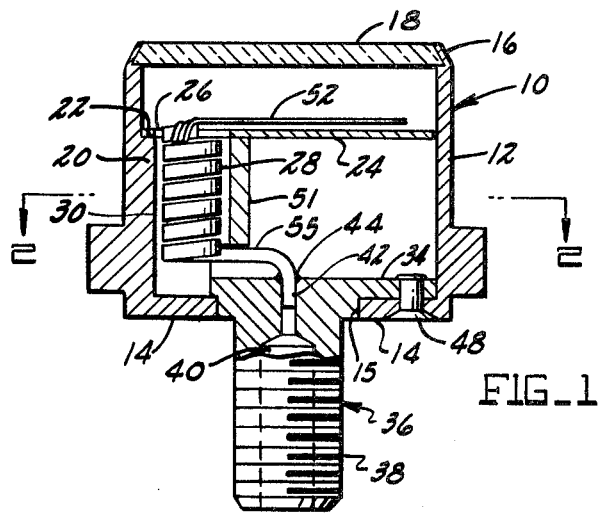
FIG_1
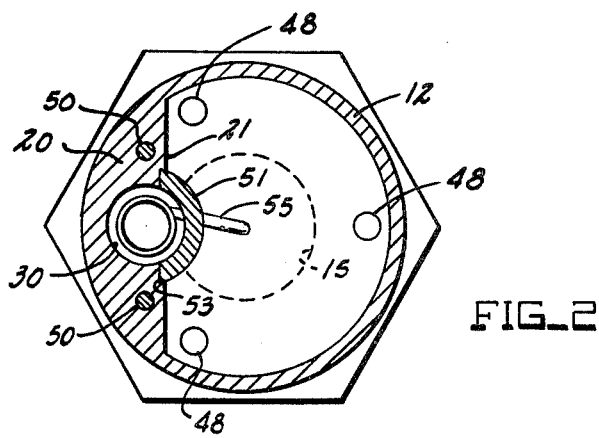
FIG_2
INVENTOR.
DONALD R. MITCHELL
BY JOHN E. McRAE
TENNES I. ERSTAD
ATTORNEYS

3,282,112
PRESSURE GAGE

Donald Robert Mitchell, Glendora, Calif., assignor to American Radiator & Standard Sanitary Corporation, New York, N.Y., a corporation of Delaware
Filed Mar. 12, 1965, Ser. No. 439,201
5 Claims. (Cl. 73—418)

This invention relates to pressure gages, and particularly to gages employing helical Bourdon tubes in direct connection with indicating arms.

Helical Bourdon tube gages of the above-mentioned type sometimes include wall structures for stabilizing the helical coil against vibrational effects. Heretofore such stabilizing wall structures have been formed separately from the gage housing, and have not always completely surrounded the coil to obtain the best obtainable stabilizing action. The stabilizing wall structures were necessarily precision pieces because of their own tolerances and tolerances in the housing component. The cost of the gage was therefore relatively high.

One object of the present invention is to provide a helical Bourdon tube gage wherein the helical Bourdon tube is stabilized against vibrational disturbances by means of an improved stabilizer wall structure which completely surrounds the helical coil.

It is another object to provide a helical Bourdon pressure gage wherein the number of component parts is less than in prior art gages.

A further object is to provide a helical Bourdon tube pressure gage wherein comparatively few assembly operations are required to operatively connect the component parts together.

A general object is to provide a helical Bourdon tube pressure gage having desired features of low cost and long service life.

Other objects of this invention will appear from the following description and appended claims, reference being had to the accompanying drawings forming a part of this specification wherein like reference characters designate corresponding parts in the several views.

In the drawings:

FIGURE 1 is a longitudinal sectional view taken through one embodiment of the invention;

FIG. 2 is a sectional view taken substantially on line 2—2 of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 of the drawings, there is shown a helical Bourdon tube pressure gage comprising a tubular housing 10 having a tubular side wall 12 and an end wall or flange 14 at its lower end defining a central opening 15. The upper end portion 16 of the tubular side wall is of reduced thickness and is staked onto the bevelled edge of a viewing window 18.

Internally the housing is formed with a hollow boss or wall structure 20 which as shown in FIG. 2 is of generally segmental or half-moon configuration. As shown in FIG. 1, the boss terminates below viewing window 18 to form a shoulder 22 for mounting a fixed dial plate 24. The dial plate is of circular outline to conform with the internal diameter of the tubular housing wall 12; however it is provided with a small circular opening 26 which permits the uppermost convolution of a helical Bourdon tube 28 to project above it. Screws 50 are threaded into tapped holes in boss 20 to retain the dial plate in position.

As shown in FIG. 2, boss 20 is provided with a hollow cavity 30 in its side surface 21. The cavity extends downwardly from the aforementioned shoulder 22 to end wall 14 of the housing. As shown in FIG. 1, the internal surface of wall 14 is facially engaged with the flange or plate portion 34 of a pressure-admitting fitting generally designated by numeral 36. Securement of the fitting to housing 10 may be effected by three rivets 48. Tubular portion 38 of the fitting is externally threaded and internally bored to provide a passage 40 which communicates with the downturned end portion 42 of the Bourdon tube 28. Plate portion 34 is of circular outline except for its right edge area which is cut away to accommodate boss 20 of the housing.

Preferably the Bourdon tube is formed into its illustrated helical configuration and is then assembled to the fitting 36 before connection of fitting 36 with housing 10. The Bourdon tube may be affixed to the fitting by silver brazing at 44. With Bourdon tube 28 affixed to fitting 36 the assembly can be inserted axially downwardly into housing 10 so that helical coil portion 46 of the tube moves downwardly into cavity 30 of boss 20. Thereafter fitting 36 can be affixed to housing 10 by the three spaced rivets 48.

With fitting 36 affixed to housing 10 the cavity 30 can be closed by a second wall structure 51. In the illustrated gage wall structure 51 fits into a slideway 53 for vertical movement to its installed position, said slideway terminating a slight distance above the radial portion 55 of tube 28 to limit the downward motion of structure 51. Adhesive may be added at the joints between structure 51 and slideway 53, although the interlocking fit provided by the slideway may be sufficient in certain installations to retain the wall structure in place. It will be noted in this connection that dial plate 24 overlies structure 51 to preclude upward displacement thereof. In some cases total reliance may be placed on the adhesive without the interlocking fit of the illustrated slideway.

After fitting 36 and wall structure 51 are affixed to housing 10 dial plate 24 can be positioned on the aforementioned shoulder 22 of boss 20 and secured thereto by a pair of screws 50 which thread into tapped openings in the boss. The indicator arm 52 can then be affixed to the uppermost convolution of the Bourdon tube 28, as by any suitable adhesive. The indicator arm is preferably a simple length of straight wire having a coiled end portion which fits around the end portion of the Bourdon tube.

In service this gage may be subjected to considerable vibration and shock such that helical coil portion 46 of the Bourdon tube may have a tendency to waiver or vibrate in lateral directions. The illustrated gage uses a helical Bourdon coil having six convolutions. However in practice the coil can have a longer axial dimension and can include more convolutions, as for example eight or nine. Therefore the coil may have a comparatively long axial dimension in relation to its diameter such that vibrational conditions can have a decided tendency to vibrate the coil and the attached indicator arm 52. In the illustrated arrangement the coil is stabilized against such vibration by boss 20 and wall structure 51, and particularly by the cylindrical surface provided by the defined cylindrical chamber.

In some instances the coil tends to undergo vertical vibration about the bend area between tube portions 55 and 42. By locating wall structure 51 with its lower edge closely adjacent tube portion 55 this vibration can be arrested, thereby precluding possible fatigue in the tube bend area.

In the illustrated gage boss 20 is formed integrally with housing 10. The cavity 30 is therefore economically formed as part of the operation of die casting or otherwise forming the housing. As a result the manufacturing cost and assembly cost for a special part are avoided. Additionally, the gage is made more rigid and less susceptible to damage by the extreme shock conditions which are sometimes encountered during service. Preferably housing 10, with its integral boss 20, is formed as an aluminum component. Fitting 36 may be formed of stainless steel. The Bourdon tube may be formed of Inconel alloy.

What is claimed:

1. A pressure gage comprising a tubular housing; a Bourdon tube comprising a helical coil disposed within the housing with its axis parallel to, but offset from, the housing axis; said coil having an open end portion; fitting means connected to said open end portion and affixed to the housing for admitting fluid pressure to the interior of the coil to unwind same about its axis; and wall means within the housing for stabilizing the coil against vibrational movements crosswise of its axis; said stabilizing wall means comprising two wall structures cooperatively defining a cylindrical chamber which confines the coil therewithin; a first one of said wall structures defining a hollow cavity which partially surrounds the helical coil, but which is open along the side thereof which faces the axis of the housing; the second wall structure extending across the open side of the first wall structure to define the remaining portion of the cylindrical chamber.

2. A pressure gage comprising a tubular housing; a hollow pressure-admission fitting closing one end of the housing; a Bourdon tube comprising a helical coil disposed within the housing with its axis parallel to, but offset from, the housing axis, and a hollow anchoring portion extending from the coil into sealed connection with a portion of the fitting located on the housing axis whereby pressure within the fitting is applied to the interior of the coil to unwind same about its axis; and wall means within the housing for stabilizing the coil against vibrational movements crosswise of its axis; said stabilizing wall means comprising two wall structures cooperatively defining a cylindrical chamber which confines the coil therewithin; a first one of said wall structures defining a hollow cavity which partially surounds the helical coil, but which is open along the side thereof which faces the axis of the housing to permit insertion of the coil into the cavity without obstruction from the coil's hollow anchoring portion; the second wall structure extending across the open side of the first wall structure to define the remaining portion of the cylindrical chamber.

3. The combination of claim 2, wherein the first wall structure is formed integrally with the tubular housing.

4. The combination of claim 2 wherein the second wall structure has an interlocking fit with the first wall structure whereby connection of the two wall structures is effected by relative slidable movement thereof in a direction parallel to the axis of the cylindrical chamber.

5. A pressure gage comprising a one piece housing having a tubular side wall, a hollow boss integral with said side wall, and an annular end wall extending radially inwardly from one end of the side wall to define an opening centered on the housing axis; a one-piece fitting comprising a plate portion facially engaging the inner surface of the housing end wall, and a hollow tubular portion extending outwardly through the end wall opening on the housing axis; rivet means extending through the plate portion and housing end wall to secure the fitting and housing together; said hollow boss extending within the housing from the housing end wall toward the other end of the housing to define a mounting shoulder for a dial plate; said boss having a side surface facing the housing axis, and a cavity in said side surface extending from the housing end wall to the mounting shoulder; an arcuately contoured wall structure secured to the side surface of the hollow boss and cooperating with the cavity to define a cylindrical coil stabilizer chamber; said wall structure having one end thereof spaced from the plate portion of the fitting to define a passage; a helical Bourdon tube having a helical coil disposed within the cylindrical stabilizer chamber, and a hollow anchoring portion extending from the coil through the aforementioned passage and thence axially into the fitting whereby pressure within the fitting is applied to the interior of the coil to unwind same about its axis; a dial plate mounted on the aforementioned shoulder and extending across the tubular housing, and a pointer carried by the portion of the Bourdon coil located adjacent the dial plate to read thereagainst as the coil winds and unwinds about its axis.

References Cited by the Examiner
UNITED STATES PATENTS 2,929,249  3/1960  Lindsay _____ 73—418

LOUIS R. PRINCE, *Primary Examiner.*